United States Patent Office 3,845,102
Patented Oct. 29, 1974

3,845,102
PROCESS FOR PREPARING THE METHACRYLATE ESTERS OF MULTIBROMINATED PHENOL DERIVATIVES
Masaru Higuchi and Kyozo Arimoto, Saitama, Japan, assignors to Daicel Ltd., Osaka, Japan
No Drawing. Filed Dec. 10, 1971, Ser. No. 206,934
Claims priority, application Japan, Dec. 14, 1970, 45/11,464
Int. Cl. C07c 69/54
U.S. Cl. 260—479 R        12 Claims

ABSTRACT OF THE DISCLOSURE

A process for preparing the methacrylate esters of multibrominated phenol derivatives, by reacting phenol derivatives of the formula:

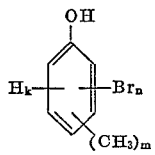

(wherein $n$ is an integer 3, 4 or 5, $m$ is an integer 0, 1 or 2, $k$, is an integer 0, 1 or 2, and $n+m+k=5$) with methacrylic acid chlorides in the presence of a pyridine base.

BACKGROUND OF THE INVENTION

Field of the invention

This invention relates to a process for preparing methacrylate esters of multibrominated phenol derivatives.

DESCRIPTION OF THE PRIOR ART

The methacrylate esters of multibrominated phenol derivatives are useful for making flame retarding high polymer compositions and agricultural chemicals. (Belgian Pat. No. 624,340 and Chemical Abstracts 60 12187 A (1964)).

The brominated phenol derivatives utilizable for flame retarding agents preferably contain a benzene ring substituted at 3 or more positions with bromine atoms.

The conventional process of making such derivatives, for example, the reaction of 2,4,6-tribromophenol with methacrylic acid chloride in a caustic soda solution in methanol provides a yield of 15 percent, based on the mols of 2,4,6-tribromophenol, whereas the reaction of pentabromophenol with methacrylic acid chloride under the same conditions provides a yield of 31 percent. It is strongly desired to improve these low yields (see J. Am. Chem. Soc. 81, 4310 (1959) by G. Sumrell, P. G. Campbell, G. E. Ham and C. H. Schramm).

A process employing a protonic acid catalyst, such as sulphuric acid, and noncatalytic processes are known in general for the esterification of phenols (Wagner and Zook in "Synthetic Organic Chemistry"; P. 481, John Wiley & Sons, New York (1953)), but these reactions provide poor yields, and even in the sulphuric acid process, at the highest a yield of only 20 percent is obtained.

On the other hand, the methacrylate esters of multibrominated alkyl phenol derivatives in which the benzene ring is bromine substituted at more than 3 positions have not been studied.

It is well known to employ Lewis bases for the esterification of phenols, but it is also known that methacrylate derivatives in contact with Lewis bases promote polymerization. It will be expected fro mthis fact that such polymerization will reduce the yield of the desired methacrylate ester to be obtained by esterification.

SUMMARY OF THE INVENTION

However, we have found, surprisingly in view of the prior art, that the reaction of the multi-brominated phenol derivative with methacrylic acid chloride in the presence of a pyridine base does not suffer from such expected polymerization loss, but rather the multibromophenol methacrylate ester is obtained at a high yield of at least 60 percent.

The following diagrammatic reaction formula is set forth to promote an understanding of the reaction process comprising the invention.

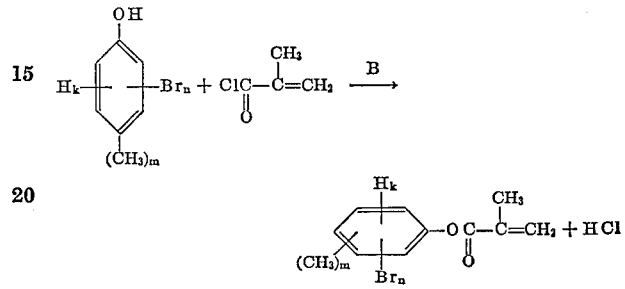

wherein
B denotes a pyridine base,
$n$ is an integer 3, 4 or 5,
$k$ is an integer 0, 1 or 2,
$m$ is an integer 0, 1 or 2, and
$n+k+m=5$.

The bromophenol derivatives employable in the invention are obtained by the conventional process from phenol or alkyl phenol and bromine.

The pyridine base employed in the invention is added and reacted with the acidic bromophenol derivative prior to the addition of methacrylic acid chloride or it is added to the bromophenol derivative while hydrogen chloride is being generated by the reaction of the derivative with methacrylic acid chloride.

Examples of pyridine bases employable in the invention includes pyridine, picoline, lutidine, other pyridines and mixtures thereof. The quantity of the pyridine base to be used is preferably within the range of 0.4–2.0 mol per mol of bromophenol derivatives.

In the esterification of bromophenol derivatives by methacrylic acid chloride according to the present invention, the employment of a reaction solvent is preferable in order to obtain desirable results. The solvents are preferably liquids having boiling points higher than 60° C., which are substantially nonreactable with the starting materials and the reaction products and which can dissolve the starting materials. Examples of suitable reaction solvents include, for example, benzene, toluene, xylene, methyl naphthalene and other aromatic hydrocarbons; chloroform, carbon tetrachloride, dichloroethane and other halogenated hydrocarbons; diisopropylether, dioxane, ethyleneglycol-diethyl ether and other ethers; ethyl acetate, butyl acetate and other esters; acetonitrile and other nitriles; nitromethane, nitrobenzene and other nitrohydrocarbons. These solvents are utilized singly or as a mixture of two or more of them. The quantity of the solvent to be used is not limited, but should be more than the quantity needed to dissolve the starting materials at the reaction temperature.

The molar ratio of methacrylic acid chloride to bromophenol derivative, in the reaction system, is within the range of 0.5–5.0 mol of methacrylic acid chloride to 1 mol of the bromophenol derivative, preferably 1.0–2.0:1.

The reaction temperature is within the range of 50° to 200° C. and preferably is within the range of 100° C. to 160° C. The reaction proceeds too slowly at a temperature lower than 50° C., while undesirable side reactions, such as decomposition, may occur at a temperature higher than 200° C. The pressure of a polymerization inhibitor in the reaction system is not always essential, but known polymerization inhibitors such as sulphur, copper and cuprous chloride, may be added during or after the reaction. The amount of polymerization inhibitor added is in the range of 0.0001 to 0.05, based on the mols of the bromophenol derivative. These polymerization inhibitors may be, of course, removed by filtration, washing, distillation or other convenient methods, if desired. The reaction pressure is not critical and the reaction can be carried out under reduced, atmospheric or somewhat elevated pressure. The ambient atmosphere of the reaction system also is not critical and it may include air.

The multibrominated phenol derivative methacrylate esters obtained by the process of the invention may be separated and refined by usual methods such as distillation and crystallization. Other conventional methods may also be adopted.

The methacrylate esters of multibrominated phenol or alkyl phenol derivatives to be obtained by the process of the present invention are useful for making flame retarding high polymer compositions and agricultural chemicals.

Specific examples of the invention will be described below, but the invention will not be limited to these examples.

In the examples, unless otherwise noted, the term "parts" refers to parts by weight.

Example 1

Synthesis of 2,4,6-tribromophenyl methacrylate ester

There were introduced into a flask 508 parts of 2,4,6-tribromophenol, 140 parts of β-picoline, 3 parts of cuprous chloride, and 640 parts of commercial mixed xylene. The contents were heated to 100° C., and 226 parts of methacrylic acid chloride was added dropwise with vigorous agitation over a period of one hour. After the addition was completed, the reaction mixture was heated at 100° C. for 4 more hours, then the temperature was raised to 140° C. and the reaction was continued for 5 hours to completion. After the completion of the reaction, the mixture was cooled and left to stand at room temperature. The reaction mixture separated into two layers, and the lower layer coagulated. The upper layer (xylene solution) was separated and washed with 1 N caustic soda solution until the pH of the rinse solution became more than 10 to remove excess methacrylic acid chloride and unreacted tribromophenol. The xylene solution was again rinsed with 1 N hydrochloric acid til the pH of the rinse solution became less than 3 to remove alkali in the xylene solution. Then the xylene solution was cleaned with a saturated sodium chloride solution till the pH of the rinse solution became 4–6, then it was dried with 150 parts of sodium sulphate. After the sodium sulphate was filtered off and the solvent was removed by distillation under reduced pressure, 550 parts of 2,4,6-tribromophenyl methacrylate ester were obtained by distillation under reduced pressure. Yield: 89.7 percent.

The physical properties of the obtained 2,4,6-tribromophenyl methylacrylate ester are as follows:

Boiling point 134.0° C./0.5 mm. Hg (reported in literature as 123–125° C./0.2 mm. Hg)
Melting point 68–69° C. (recrystallized from methanol)
Analysis. — Theoretical value: C, 30.26%; H, 1.27%. Found: C, 30.14%; H, 1.76%.
IR Absorptions (by KBr-method):
    A carbonyl absorption due to ester radical at 1737 cm.$^{-1}$.
    An absorption due to the methacrylate double bond at 1628 cm.$^{-1}$ NMR Absorptions:
    There exist the absorptions with peak area ratio of 2:1:1:3 at 2.30, 5.55, 4.16 and 7.89 respectively. No other significant absorptions.

Example 2

Synthesis of 2,4,6-tribromophenyl methacrylate ester

A mixture of 100 parts of 2,4,6-tribromophenol, 22 parts of pyridine, 1 part of cuprous chloride, and 130 parts of mixed xylene was heated to 100° C. and then 44.5 parts of methylacrylic acid chloride was added in drops over a period of 20 minutes with vigorous agitation. After finishing the dropwise addition, the reaction temperature was raised to 140° C. and was maintained at that level for 20 hours. After the reaction was completed, the mixture was treated in the same way as in Example 1 and, after removing the low boiling point fraction, it was distilled under reduced pressure to obtain 93.4 parts of 2,4,6-tribromophenyl methacrylate esters. Yield: 77.8 percent.

Example 3

Synthesis of 2,4,6-tribromophenyl methacrylate ester

There were reacted 100 parts of 2,4,6-tribromophenol, 27.0 parts of α-picoline, 1 part of cuprous chloride, 130 parts of mixed xylene and 37.8 parts of methacrylic acid chloride in the same way as described in Example 2 to obtain 86.0 parts of 2,4,6-tribromophenyl methacrylate ester. Yield: 71.7 percent.

Example 4

Synthesis of 2,4,6-tribromophenyl methacrylate ester

There were reacted 33.1 parts of 2,4,6-tribromophenol, 4.7 parts of β-picoline, 0.1 part of cuprous chloride, 26 parts of mixed xylene and 12.5 parts of methacrylic acid chloride in the same manner as described in Example 1 to obtain 28.0 parts of 2,4,6-tribromophenyl methacrylate ester. Yield: 78.0 percent.

Example 5

Synthesis of 2,4,6-tribromophenyl methacrylate ester

There were reacted 53.1 parts of 2,4,6-tribromophenol, 14.0 of β-picoline, 0.1 part of cuprous chloride, 26 parts of mixed xylene and 12.5 parts of methacrylic acid chloride in the same manner as described in Example 1 to obtain 28.1 parts of 2,4,6-tribromophenyl methacrylate ester. Yield: 70.2 percent.

Example 6

Synthesis of pentabromophenyl methacrylate ester

There was introduced into a flask 25 parts of pentabromophenol, 4.7 parts of β-picoline, 0.1 part of cuprous chloride, and 86 parts of commercial mixed xylene. The contents were heated to 100° C. and 8.5 parts of methacrylic acid chloride was added dropwise over a period of 20 minutes. After the completion of the dropwise addition, the mixture was heated at 100° C. for an additional 30 minutes and subjected to reaction at 120° C. for 7 hours to complete the reaction.

The mixture was treated in the same fashion as in Example 1 and washed and then dried with sodium sulphate. According to a conventional process, the sodium sulphate was separated and the solvent was evaporated under reduced pressure to obtain 20.9 parts of light brown crystals of pentabromophenyl methacrylate ester. Yield: 73.0 percent.

The physical properties of obtained pentabromophenyl methacrylate ester are set forth below:

Melting point 138–140° C. (recrystallized from methanol-benzene) (Literature value: 138–140° C.)
Analysis. — Theoretical value: C, 21.42%; H, 0.90%. Found: C, 21.14%; H, 0.91%.
IR Absorptions (by KBr-method):
    A carbonyl absorption due to ester radical at 1738 cm.$^{-1}$.
    An absorption due to acrylate carbon-carbon double bond at 1634 cm.$^{-1}$.

NMR Absorption:
There exist the absorptions with peak area ratio of 1:1:3 at 3.52, 4.10 and 7.86 respectively. No other significant absorptions.

Example 7

Synthesis of 2,4,6-tribromo-3-methylphenyl methacrylate ester

There were reacted 34.5 parts of 2,4,6-tribromo-m-cresol, 9.3 parts of β-picoline, 0.1 part of cuprous chloride, 86 parts of mixed xylene and 16.4 parts of methacrylic acid chloride in the same was as described in Example 5 to obtain 25.2 parts of yellow crystals of 2,4,6-tribromo-3-methylphenyl methacrylate ester. Yield: 61.1 percent.

The physical properties of the obtained 2,3,6-tribromo-3-methylphenyl methacrylate ester are as set forth below:
Boiling point 137–138° C./0.2 mm. Hg
Melting point 52–54.5° C.
Analysis.—Theoretical value C, 31.99%; H, 2.20%.
Found: C, 32.49%; H, 2.13%.
IR Absorptions (by KBr-method):
A carbonyl absorption due to ester radical at 1745 cm.$^{-1}$
An absorption due to the methacrylate C=C double bond at 1635 cm.$^{-1}$
NMR Absorption:
There exist the absorptions with peak area ratio of 1:1:1:3:3 at 2.23, 3.55, 4.21, 7.45 and 7.90 respectively, not no other significant absorptions.

Example 8

Synthesis of 2,3,5,6-tetrabromo-4-methylphenyl methacrylate ester.

There were reacted 42.4 parts of 2,3,5,6-tetrabromo-p-cresol, 10 parts of β-picoline, 0.5 parts of cuprous chloride, 86 parts of mixed xylene and 15 parts of methacrylic acid chloride in the same manner as described in Example 15 to obtain 35.6 parts of white crystals of 2,3,5,6-tetrabromo-4-methylphenyl methacrylate ester. Yield: 72.4 percent.

The physical properties of the obtained 2,3,5,6-tetrabromo-4-methylphenyl methacrylate ester are set forth below:
Melting point 119.5–120.5° C. (recrystallized from methanol)
Analysis.—Theoretical value: C, 26.64%; H, 1.63%.
Found: C, 26.94%; H, 1.69%.
IR Absorption (by KBr-method):
A carbonyl absorption due to ester radical at 1735 cm.$^{-1}$
An absorption due to the methacrylate C=C double bond at 1634 cm.$^{-1}$
NMR Absorption:
There exist the absorptions with peak area ratio of 1:1:3:3 at 3.56, 4.18, 7.19 and 7.88 respectively, but no other significant absorptions.

Comparative Example 1

Synthesis of 2,4,6-tribromophenyl methacrylate ester.

There was introduced into a flask 10 parts of 2,4,6-tribromophenol, 43 parts of commercial toluene and 0.1 part of cuprous chloride. The contents were heated to 100° C. and 3.8 parts of methacrylic acid chloride were added dropwise over a period of 10 minutes with vigorous stirring. After finishing the dropwise addition, the reaction temperature was raised for 6 hours' strong reflux of toluene. After that, the cooled mixture was washed with 1 N caustic soda solution until the pH of the rinse solution became about 5 and then it was washed with 50 ml. of saturated sodium chloride solution three times, then was dried with 5 g. of sodium sulphate. After sodium sulphate was removed by filtration and toluene was distilled away, 6.2 parts of a solid was obtained. The IR absorption spectrum of the solid product was compared with that of the starting material, i.e., 2,4,6-tribromophenol. The comparision confirmed that the residual solid from the distillation of toluene is 2,4,6-tribromophenol.

Comparative Example 2

Synthesis of 2,4,6-tribromophenyl methacrylate ester.

To a flask, there was added 25 parts of 2,4,6-tribromophenol, 103 parts of commercial mixed xylene, 0.5 part of cuprous chloride, and 0.05 part of sulphuric acid. The contents were heated to 100° C. in the flask and 10 parts of methacrylic acid chloride was added dropwise over a period of 20 minutes with vigorous stirring. After finishing the dropwise addition, the temperature was raised to reflux xylene for 20 hours. After the heating was finished, the reaction mixture was cooled and treated similarly to Example 1 to obtain 6.25 parts of brown-colored 2,4,6-tribromophenyl methacrylate ester. Yield: 20.7%.

The embodiments of the invention in which an exclusive property or privilege is claimed are defined as follows:

1. A process for preparing methacrylate ester of multi-bromominated phenol derivative, which comprises reacting a compound of the formula:

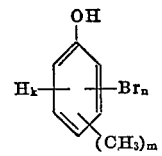

wherein n is integer 3, 4 or 5, m is an integer 0, 1 or 2, k is an integer 0, 1 or 2, and n+m+k=5, with methacrylic acid chloride in the presence of a pyridine base, at a temperature in the range of 100 to 160° C.

2. A process according to Claim 1, in which the pyridine base is selected from the group consisting of pyridine, picolines, lutidines and mixtures thereof.

3. A process according to Claim 1, in which the pyridine base is present in the reaction system in an amount in the range of 0.4–2.0 mol, per mol of phenol derivative.

4. A process according to Claim 1 in which the molar ratio of methacrylic acid chloride to phenol derivative in the reaction system is within the range of 0.5–5.0:1.

5. A process according to Claim 1, in which the multi-brominated phenol derivative is selected from the group consisting of tribromophenol, tetrabromophenol and pentabromophenol.

6. A process according to Claim 1, in which the multibrominated phenol derivative is selected from the group consisting of tribromocresol and tetrabromocresol.

7. A process according to Claim 1, in which the reaction is carried out in the presence of a reaction solvent selected from the group consisting of aromatic hydrocarbons, ethers, esters, nitriles and nitrohydrocarbons having a boiling point higher than 60° C.

8. A process according to Claim 1, which comprises producing 2,4,6-tribromophenyl methacrylate ester by reacting 2,4,6-tribromophenol with methacrylic acid chloride in the presence of β-picoline in an inert solvent.

9. A process according to Claim 1, which comprises producing pentabromophenyl methacrylate ester by reacting pentabromophenol with methacrylic acid chloride in the presence of β-picoline in an inert solvent.

10. A process according to Claim 1, which comprises producing 2,4,6-tribromo-3-methylphenyl methacrylate ester by reacting 2,4,6-tribromo-m-cresol with methacrylic acid chloride in the presence of β-picoline in an inert solvent.

11. A process according to Claim 1, which comprises producing 2,3,5,6-tetrabromo - 4 - methylphenyl methacrylate ester by reacting 2,3,5,6-tetrabromo-p-cresol with methacrylic acid chloride in the presence of β-picoline in an inert solvent.

12. A process for preparing methacrylate ester of multibrominated phenol derivative, which comprises reacting a compound of the formula

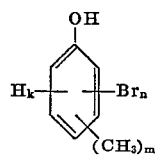

wherein $n$ is an integer 3, 4 or 5, $m$ is an integer 0, 1 or 2, $k$ is an integer 0, 1 or 2, and $n+m+k=5$, with methacrylic acid chloride, wherein the mol ratio of methacrylic acid chloride/said compound is in the range of 0.5/1.0 to 5.0/1.0, in an inert solvent having a boiling point higher than 60° C., in the presence of a polymerization inhibitor wherein the amount of polymerization inhibitor is 0.0001 to 0.05 based on the mols of said compound, at a temperature in the range of 100 to 160° C. until said methacrylate is ester is formed, and recovering said methacrylate ester from the reaction mixture.

References Cited

UNITED STATES PATENTS

| | | | |
|---|---|---|---|
| 2,384,306 | 9/1945 | Hester et al. | 260—479 |
| 2,526,660 | 10/1950 | Hester et al. | 260—479 |
| 2,278,634 | 4/1942 | Barnes | 260—479 |
| 2,353,684 | 7/1944 | Miescher et al. | 260—479 |
| 2,862,022 | 11/1958 | Cook et al. | 260—479 |
| 3,175,024 | 3/1965 | Tocker | 260—479 |

OTHER REFERENCES

Rehberg et al.: J. Org. Chem. Vol. 67 (1945), pp. 208–210.

Wheland, G. W.: Resonance In Organic Chemistry, Wiley, N.Y. (1955), p.p. 345, 346, 353, 354, 367, 368.

Gould, E. S.: Mechanism And Structure In Org. Chem., Holt, N.Y. (1959), pp. 218, 221.

JAMES A. PATTEN, Primary Examiner